UNITED STATES PATENT OFFICE.

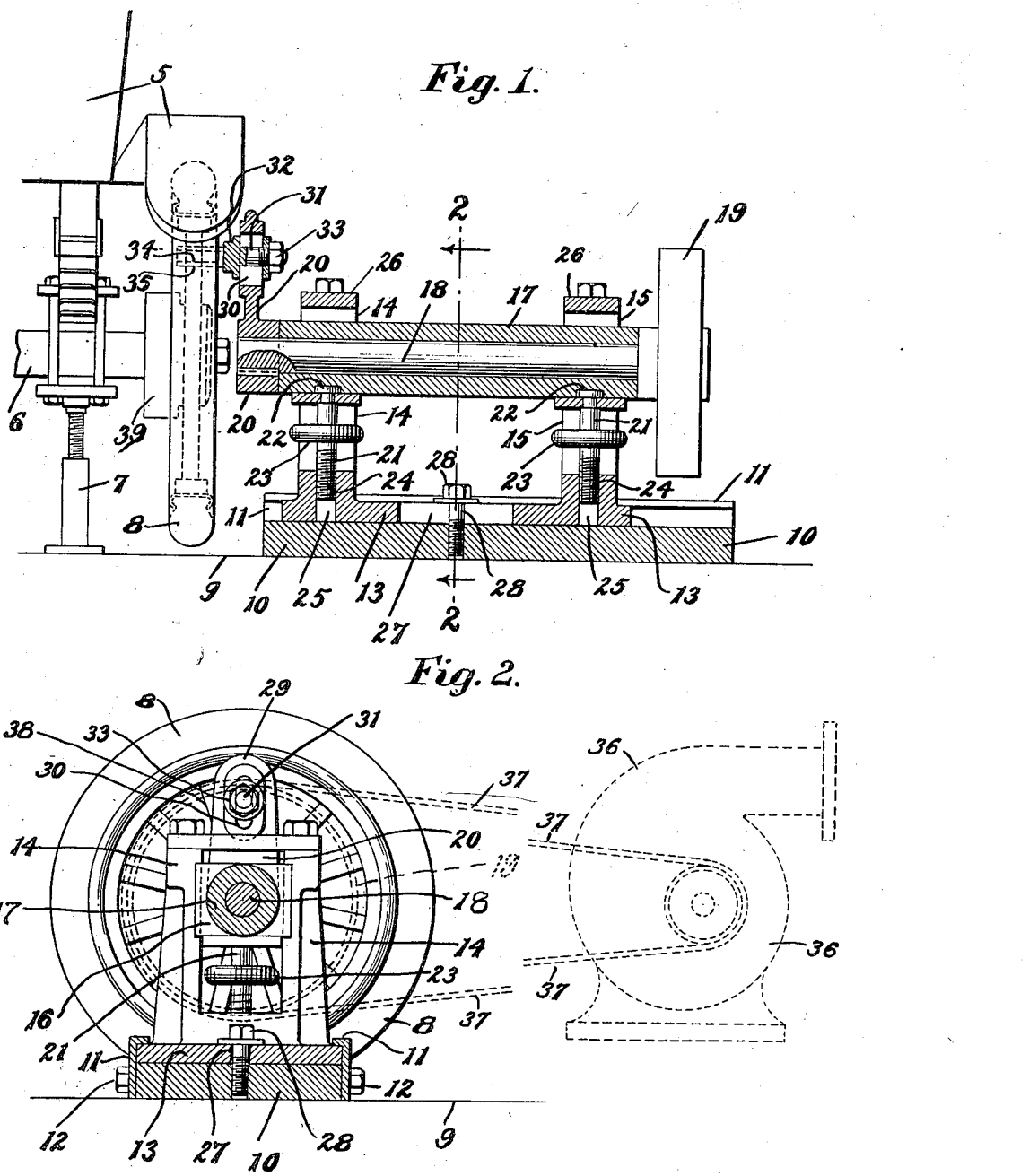

HARRY H. HARTUNG, OF BOSTON, MASSACHUSETTS.

POWER-TRANSMITTING DEVICE.

1,380,714.  Specification of Letters Patent.  Patented June 7, 1921.

Application filed June 26, 1919. Serial No. 306,770.

*To all whom it may concern:*

Be it known that I, HARRY H. HARTUNG, a citizen of the United States of America, and resident of Boston, in the county of Suffolk and State of Massachusetts, have invented a new and useful Power-Transmitting Device, of which the following is a specification, reference being had to the accompanying sheet of drawing, forming part thereof.

The object of my invention is to provide a simple device which is preferably intended for use in connection with automobiles for transmitting power therefrom to other nearby power operated machinery, as grinding machines, pumps, blowers, saw mills, threshers and the like.

Another object of the invention is to provide a device as aforesaid, which is designed with a crank attachment adapted to temporarily engage with the driving wheel of an automobile (when said driving wheel is jacked up and free to turn without making contact with the ground or flooring) for rotating together with said wheel for driving a pulley provided on said device which transmits power to the apparatus to be driven.

Still another object of the invention is to provide a device, embodying the aforesaid features, which is adjustable to operate with various types and sizes of automobile wheels, said device being either of the stationary type or portable, according as may be desired.

To these as well as other ends my invention consists of the novel features of construction, combination and arrangement of parts described in the following specification and particularly pointed out in the subjoined claims.

In order to illustrate my invention, I have shown in the accompanying sheet of drawing one embodiment thereof, but I do not wish to be limited thereto, inasmuch as changes may be made in the design of the same as to the various features embodied therein without departing from the spirit and scope of the invention.

Referring to the drawing:—

Figure 1 represents a rear elevational view of a part of an automobile showing the driving wheel jacked up to clear the ground or flooring, with my device temporarily coupled therewith for transmitting the turning effort of said automobile driving wheel to another rotatably operated device or apparatus for operating the latter,—the device being shown substantially in cross-section for more clearly exhibiting the same.

Fig. 2 represents a sectional view taken on line 2—2 on Fig. 1, looking in the direction of the arrows, and indicates by the dotted lines the coupling thereof, through the medium of an endless belt, with a blower, or other rotatably driven apparatus for driving the same.

The terms employed herein are used in the generic and descriptive sense to designate the elements illustrated, and are therefore not specifically intended as terms of limitation.

Like numerals refer to like parts throughout the several views of the drawing.

In the drawing the numeral 5 represents an automobile having the rear or driving axle 6 supported on the jack 7 for raising the driving wheel 8 of the automobile from off the ground or flooring 9 so that the wheel clears the latter and is free to turn upon its axis without propelling the vehicle. 10 represents the sub-base of my device, which may be anchored (temporarily or permanently) to the ground or flooring in any suitable manner and according as may be desired. 11 represents the side retaining runs of the sub-base which may be made separate and secured thereto by the bolts 12, as shown in Fig. 2, or may be made integral therewith, according as may be desired. 13 represents the base of the standard member of the device, which is slidably fitted between the runs 11 and the sub-base 10, as shown in the drawing. Said standard member is preferably provided with the upright U-standards 14 and 15 which form the guides for the retaining and sliding journals 16 of the bearing member 17. The bearing member 17 rotatably supports therein the shaft 18 of the device, which carries secured thereto to rotate therewith the pulley member 19 at one end and the crank arm 20 at the other end thereof.

21 represents the adjustable supporting studs of the device, which are preferably rotatable and supportably coupled at the ends 22 to the journal sections 16 of the bearing member 17 in any suitable manner, and are provided with the intermediate hand wheel sections 23 for turning the same, said adjustable supporting studs being provided with the threaded ends 24 which are adapted to set and operate within the tapped holes 25 provided therefor in the standard base 13, as shown. The standards 14 and 15 are preferably provided with the bridging plates 26 at the tops thereof which are secured to the standards 14 and 15 in any suitable manner, as by being bolted thereto, as shown.

The standard base 13 is preferably provided with the elongated opening 27 through which the clamping stud 28 is coupled with the sub-base 10, as shown, for allowing or preventing the sliding of the standard member 13 upon the sub-base 10, according as to whether the clamping stud 28 is free or tight. 29 represents the arm of the crank member 20 which is preferably provided with the elongated opening 30 within which the stud 31 of the turning finger member 32 of the device may be adjusted to set in clamped relationship with the arm 29 by the nut 33. 34 represents the working end of the finger member 32 which may be provided with a rotatable or non-rotatable sleeve 35, according as may be desired, and secured thereto in any suitable manner, said sleeve member being made up of metal, wood, fiber, rubber, rubber hose, or some such other material, according as may be desired and according as to whether a hard or yielding covering is desired therefor. 36 represents a blower apparatus, and 37 represents the endless belt connection between said blower apparatus and the pulley member 19 of the device. 38 represents the spokes of the automobile wheel, and 39 represents the brake mechanism thereof.

It may here be noted that the device may be made portable or stationary, and that it may be made up substantially entirely of wood or metal, or partly wood and partly metal, according as may be desired.

Having thus described the parts of my invention in detail, the manner in which the same may be employed, is as follows:

With the rear end of the automobile jacked up to free the driving wheel from making contact with the ground or floor, the device may then be set in relation thereto with the longitudinal center line of said device in alinement with the longitudinal center line of the rear or driving axle of the automobile and with the crank side of the device nearest to the drive wheel of the automobile. Then the engaging or crank turning finger member 32 is inserted and positioned between two adjacent spokes 38 of the automobile wheel 8 so that the same will make contact with either one or the other of said spokes, depending upon the direction of rotation of the wheel 8.

Then the center line of the shaft 18 may be raised or lowered, according as may be necessary, by the turning of the hand-wheels 23 so that said shaft will be centered with the wheel 8 for turning true therewith.

The turning of the automobile wheel 8 will thus carry the crank 20 therewith, which will in turn rotate the shaft 18 of the device and the driving pulley 19 which is secured thereto to rotate therewith. The turning of the pulley 19 will carry the belt 37, and consequently the apparatus (as the blower 36, for example) which is coupled therewith, will be operated thereby; the device thus serving to transmit the turning power from the prime mover or engine of the automobile through the driving wheel 8 to said auxiliary apparatus.

It will here be noted that the turning of the handwheels 23 in one direction or the other, will raise or lower the shaft supporting bearing 17, and that the loosening of the clamping bolt 28 will allow the standard member 13 to be moved longitudinally along the sub-base 10 which will allow for the insertion or the withdrawal of the crank finger of the device in relation to the spokes of the automobile wheel. Said clamping bolt 28 will also serve, when tightened, to hold said standard member 13 in clamped or set relation with said sub-base member 10. The adjustable finger member 32 may be shifted in relation to the crank arm 29 so that the operating finger thereof may be positioned to clear the brake mechanism 39 of the wheel 8 and so that the device may be adjusted to operate with various sizes of automobile wheels without being limited to any particular size.

It will be understood that while I have shown vertical and longitudinal means of adjustment for the device proper and for the crank pin, that the same may be designed without said means of adjustment for affording simply the transmitting functions thereof, and therefore I do not limit myself thereto, since the device may be designed with a non-adjustable or stationary standard for yielding a set position for the center line of the shaft 18 thereof; the center of said shaft, however, being supported sufficiently high in the device to require the jacking up of the rear axle of the automobile so that clearance may be had between the wheel and the ground or flooring supporting the automobile.

It will also be understood that while I have shown a belt pulley 19 as being the driven member of the device, a gear or friction wheel may be substituted therefor where practicable for effecting the power transmitting function of the device.

While the preferred embodiments of my invention have been described in detail, it will be understood that I do not wish to be limited to the particular construction set forth, since various changes in the form, material, proportions and arrangement of parts, and in the details of construction may be resorted to without departing from the spirit and scope of the invention, or destroying any of the advantages contained in the same, heretofore described and defined in the subjoined claims.

Having thus described my invention in detail, what I claim as new is:—

1. A power transmitting device, comprising a standard member supporting a longitudinal bearing; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

2. A power transmitting device comprising a standard supporting an adjustable longitudinal bearing; a rotatable shaft supported in said bearing; a crank arm secured to one end of said shaft to rotate therewith and provided with a crank pin adapted to engage the driving element for said device; and a power transmitting member secured to said shaft for rotating therewith and adapted to drive an auxiliary apparatus.

3. A power transmitting device, comprising a standard supporting an adjustable longitudinal bearing; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

4. A power transmitting device comprising a standard member provided with a vertically adjustable longitudinal bearing member adjustably supported on said standard member; a rotatable shaft supported in said bearing; a crank arm provided on one end of said shaft, secured thereto to rotate therewith and provided with a crank pin adapted to engage the driving element for said device; and a power transmitting member secured to said shaft for rotating therewith and adapted to drive an auxiliary apparatus.

5. A power transmitting device comprising a standard member provided with a vertically adjustable longitudinal bearing member adjustably supported on said standard member; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

6. A power transmitting device comprising a base member; a standard member slidably secured to said base member and provided with a longitudinal bearing; a rotatable shaft supported in said bearing; a crank arm provided on one end of said shaft, secured thereto to rotate therewith, and provided with a crank pin adapted to engage the driving element for said device; and a power transmitting member secured to said shaft for rotating therewith and adapted to drive an auxiliary apparatus.

7. A power transmitting device comprising a base member; a standard member slidably secured to said base member and provided with a longitudinal bearing; a rotatable shaft supported in said bearing; a crank arm provided on one end of said shaft secured thereto to rotate therewith and provided with a crank pin adapted to engage the driving element for said device; a power transmitting member secured to said shaft for rotating therewith and adapted to drive an auxiliary apparatus; and means for securing said slidable standard member in fixed relation with said base member.

8. A power transmitting device, comprising a base member; a standard member slidably secured to said base member and provided with a longitudinal bearing; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

9. A power transmitting device, comprising a base member; a standard member slidably secured to said base member and provided with a longitudinal bearing; a rotatable shaft supported in said bearing; a crank arm secured to one end of said shaft for rotating therewith and provided with an adjustable crank pin adapted to adjustably engage the driving element for said device, a power transmitting member secured to said shaft for driving an auxiliary apparatus; and means for securing said slidable standard member in fixed relation with said base member.

10. A power transmitting device comprising a standard supporting an adjustable longitudinal bearing; means for adjusting said adjustable bearing; a rotatable shaft supported in said bearing; a crank arm provided on one end of said shaft, secured thereto to rotate therewith, and provided with a crank pin adapted to engage the driving element for said device; and a power transmitting member secured to said shaft for rotating therewith and adapted to drive an auxiliary apparatus.

11. A power transmitting device, comprising a standard supporting an adjustable longitudinal bearing; means for adjusting said adjustable bearing; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

12. A power transmitting device comprising a base member; a standard member slidably secured to said base member and provided with an adjustable bearing; means for adjusting said bearing; means for securing said standard in fixed relation with said base member; a rotatable shaft supported in said bearing; a crank arm provided on one end of said shaft, secured thereto to rotate therewith and provided with a crank pin adapted to engage the driving element for said device; and a power transmitting member secured to said shaft for rotating therewith and adapted to drive an auxiliary apparatus.

13. A power transmitting device comprising a base member; a standard member slidably secured to said base member and provided with an adjustable bearing; means for adjusting said bearing; means for securing said standard in fixed relation with said base member; a rotatable shaft supported in said bearing; a crank arm secured to one end of said shaft for rotating therewith and provided with an adjustable crank pin adapted to adjustably engage the driving element for said device; and a power transmitting member secured to said shaft for driving an auxiliary apparatus.

In testimony whereof, I hereunto set my hand this twenty-fourth day of June, 1919.

HARRY H. HARTUNG.

Witnesses:
 DAVID LICHTENSTEIN,
 B. N. CHERTOK.